(No Model.)

W. P. BROWN.
AXLE SKEIN.

No. 297,750. Patented Apr. 29, 1884.

WITNESSES
E. H. Bates,
P. C. Masi.

INVENTOR
W. P. Brown,
by Anderson & Smith
his ATTORNEYS

UNITED STATES PATENT OFFICE.

WILLIAM PATTERSON BROWN, OF ZANESVILLE, OHIO.

AXLE-SKEIN.

SPECIFICATION forming part of Letters Patent No. 297,750, dated April 29, 1884.

Application filed April 28, 1883. (No model.)

*To all whom it may concern:*

Be it known that I, WM. P. BROWN, a citizen of the United States, residing at Zanesville, in the county of Muskingum and State of Ohio, have invented certain new and useful Improvements in Axle-Skeins; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
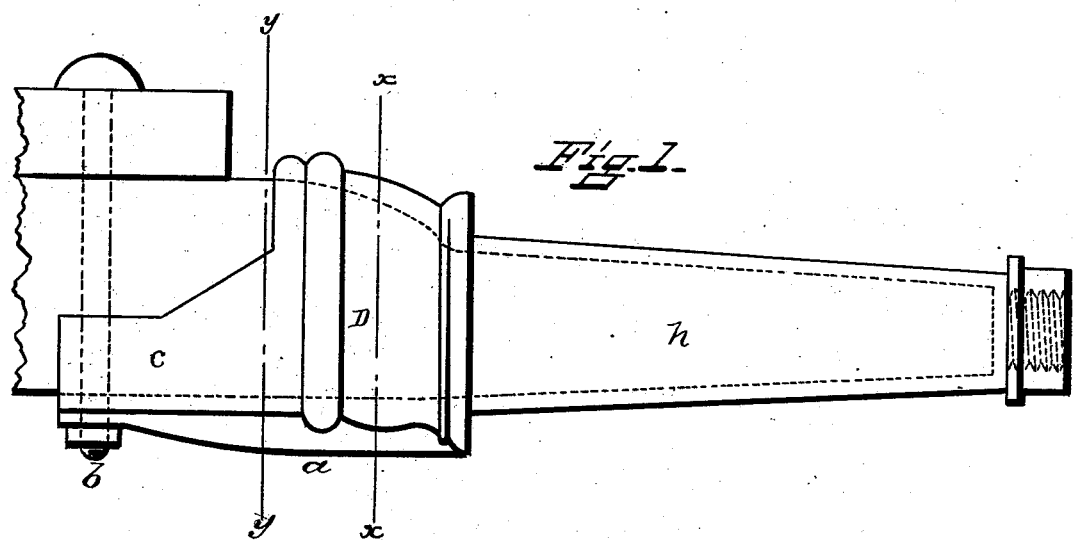
Figure 2:
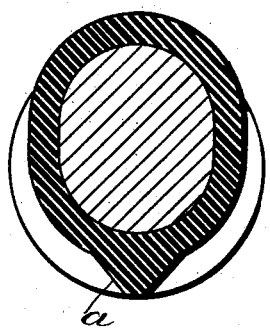
Figure 3:
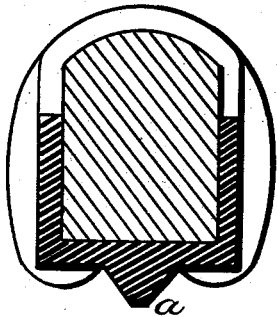

Figure 1 of the drawings is a side view of my axle-skein. Fig. 2 is a cross-sectional view of the same, taken through line $x\,x$, Fig. 1. Fig. 3 is a similar view taken through line $y\,y$.

This invention has relation to axle-skeins; and it consists in the construction and novel arrangement of devices, as will be hereinafter fully described, and particularly pointed out in the claim appended.

The idea in this invention is to strengthen the wooden axle, and the sockets in which its ends fit in the axle-skein are cone-shaped; but the axle itself is square or rectangular, and the extension from the socket or sleeve must fit the lower face of the axle and be bolted thereto, and must have vertical flanges on each side to give the greatest possible strength to the device. At its ends the upper portion of the axle is cut away to fit the socket of the axle-skein; but the lower face of the axle is left plain to fit the extension from the socket or sleeve. This extension is strengthened by a rib, $a$, cast on its under face, and should be extended to the securing-bolt $b$, passed up through the extension and axle. The ends of the axle taper on the upper side, to fit the sleeve or socket of the axle-skein, while the sides and bottom of the same are plain, to fit the base and flanges of the extension of the axle-skein. This construction gives great strength, and, being made of cast-iron, is far cheaper than steel or wrought-iron skeins, and, being cast, it allows the socket to be made much longer to receive the wooden axle, thus affording protection to the axle from overstrain when the loaded wagon is drawn on slanting ground, or when sudden shocks cause the wheel to force down on the spindle or journal of the skein, as the extension and rib on the base of the skein receive a portion of the strain. The extension extends back or inwardly under the axle to the bolt, or a distance sufficient to give it great strength. In fact, the strength is equal to an iron or steel axle, and the expense of construction is far less.

The nut, threads, and shoulder are of the usual construction.

Having thus fully described my invention, what I claim as new, and desire to secure by Letters Patent, is—

As an improved article of manufacture, the axle-skein described, consisting of the spindle portion $h$, provided at its inner end with the box-shoulder, and in rear of said shoulder with a swell-extension, having an interior shoulder and a strengthening circular rib, in rear of said rib an open top rectangular extension, and the keel-flange $a$ extending from the box-shoulder to the end of the said extension, and provided at said end with a raised flattened base to seat the securing-nut, and a perforation for the bolt which passes up through the axle, substantially as specified.

In testimony whereof I affix my signature in presence of two witnesses.

WILLIAM PATTERSON BROWN.

Witnesses:
ROBERT H. McFARLAND,
CHARLES E. PINKERTON.